United States Patent
Leblanc et al.

(10) Patent No.: US 10,137,372 B2
(45) Date of Patent: Nov. 27, 2018

(54) VIRTUAL SCENE LIGHTING WITH LIGHT PROBE CULLING BASED UPON VISIBILITY

(71) Applicant: SQUARE ENIX, LTD., London (GB)

(72) Inventors: Luc Leblanc, Montreal (CA); Jean-Francois Dufort, Montreal (CA)

(73) Assignee: SQUARE ENIX LIMITED, London (GB)

( * ) Notice: Subject to any disclaimer, the term of this patent is extended or adjusted under 35 U.S.C. 154(b) by 50 days.

(21) Appl. No.: 15/377,913

(22) Filed: Dec. 13, 2016

(65) Prior Publication Data

US 2018/0093183 A1 Apr. 5, 2018

(51) Int. Cl.

| | |
|---|---|
| G06T 15/50 | (2011.01) |
| A63F 13/525 | (2014.01) |
| A63F 13/20 | (2014.01) |
| A63F 13/25 | (2014.01) |
| A63F 13/40 | (2014.01) |
| A63F 13/90 | (2014.01) |
| G01J 1/42 | (2006.01) |
| G06T 15/00 | (2011.01) |

(Continued)

(52) U.S. Cl.
CPC .......... *A63F 13/525* (2014.09); *A63F 13/20* (2014.09); *A63F 13/25* (2014.09); *A63F 13/40* (2014.09); *A63F 13/52* (2014.09); *A63F 13/90* (2014.09); *G01J 1/42* (2013.01); *G06T 15/005* (2013.01); *G06T 15/50* (2013.01); *G06T 15/506* (2013.01); *G06T 15/55* (2013.01); *A63F 2300/66* (2013.01); *A63F 2300/6646* (2013.01)

(58) Field of Classification Search
CPC ........ G06T 15/50; G06T 15/506; G06T 15/55
See application file for complete search history.

(56) References Cited

U.S. PATENT DOCUMENTS

| 6,628,298 B1 | 9/2003 | Debevec |
| 2009/0309877 A1 | 12/2009 | Snyder et al. |

(Continued)

FOREIGN PATENT DOCUMENTS

EP 1508877 A2 2/2005

OTHER PUBLICATIONS

Extended European Search Report dated Jul. 20, 2017, in corresponding European Patent Application No. 16204196.6.

(Continued)

*Primary Examiner* — Lawrence Galka
(74) *Attorney, Agent, or Firm* — Duane Morris LLP

(57) ABSTRACT

A computer-implemented method, system and computer-readable medium for determining an illumination component for a selected point in a multi-dimensional space. The method comprises identifying a set of probes associated with the selected point, the probes located in the multi-dimensional space; for each selected one of the probes, determining which of a plurality of zones for the selected probe contains the selected point and determining visibility of said determined zone from the selected probe; and deriving an illumination component at the selected point by combining scene irradiance data associated with those of the probes from which the corresponding determined zone is determined to be visible. The illumination component being determined may be the diffuse component of global illumination as applicable to computer graphics rendering.

44 Claims, 11 Drawing Sheets

(51) Int. Cl.
*G06T 15/55* (2011.01)
*A63F 13/52* (2014.01)

(56) References Cited

U.S. PATENT DOCUMENTS

2014/0327690 A1    11/2014  McGuire et al.
2016/0260247 A1*   9/2016   Fursund .................. G06T 15/06

OTHER PUBLICATIONS

Cupisz, R., "Light probe interpolation using tetrahedral tessellations," presented at Game Developers Conference, San Francisco, CA, Mar. 5-9, 2012, in 53 pages.
Ramamoorthi, R. et al., An Efficient Representation for Irradiance Environment Maps, Stanford University, as early as Aug. 1, 2001, in 4 pages.
Sloan, P-P., "Stupid Spherical Harmonics (SH) Tricks", as early as Feb. 14, 2008, in 42 pages.
Sugden, B. et al. "Mega Meshes—Modelling, rendering and lighting a world made of 100 billion polygons," presented at Game Developers Conference, Feb. 28-Mar. 4, 2011, Moscone Cener, San Francisco, CA, in 67 pages.
Tatarchuk, N., "Irradiance Volumes for Games", presented at Game Developers Conference Europe (GDCE), Aug. 30-Sep. 1, 2005, in 59 pages.
Valient, M. "Taking Killzone Shadow Fall Image Quality into the Next Generation," as early as Mar. 17-21, 2014, in 112 pages.

* cited by examiner

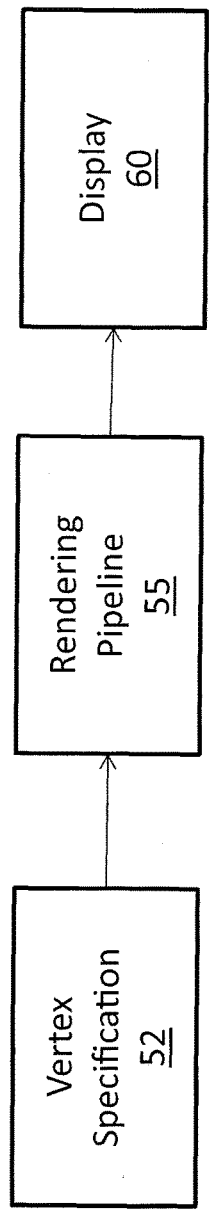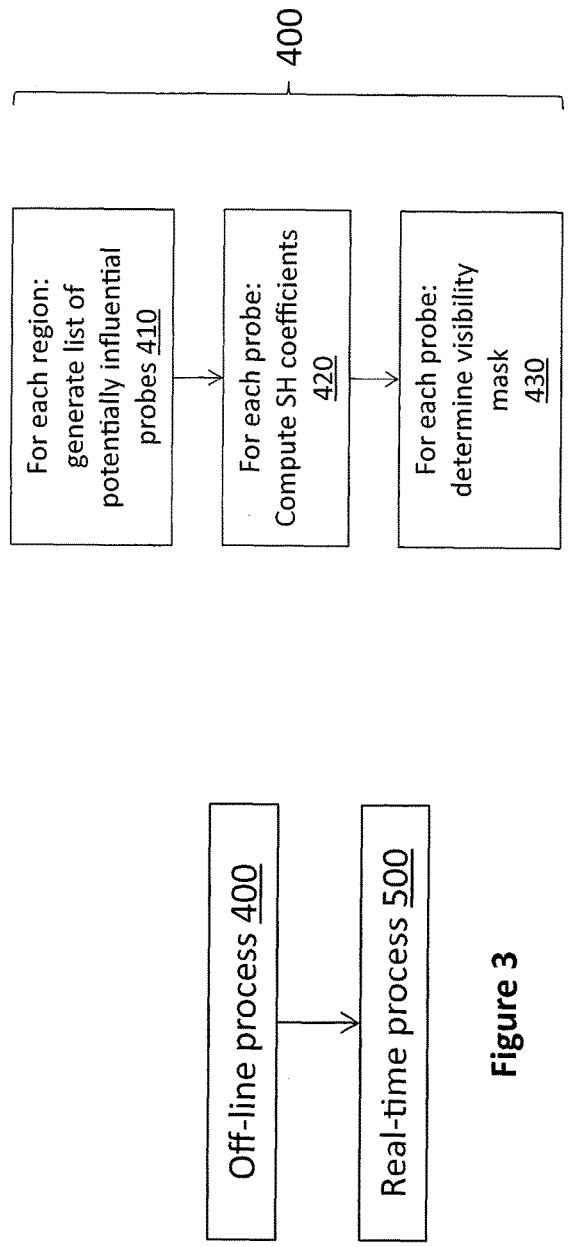

| Region (coordinates) | List of potentially influential probes |
|---|---|
| R1,1 | pr3, pr5, pr17, pr19, ... |
| R1,2 | pr2, pr3, pr6, pr9, pr10, ... |
| R1,3 | pr1, pr2, pr5, pr6, pr9, ... |
| R1,4 | pr2, pr4, pr6, pr7, pr11, ... |
| R1,5 | pr1, pr5, pr7, pr8, pr12, ... |
| ... | |

Figure 8A

| Probe (code) | SH coeff 1 | SH coeff 2 | SH coeff 3 | SH coeff 4 | SH coeff 5 | SH coeff 6 | SH coeff 7 | SH coeff 8 | SH coeff 9 |
|---|---|---|---|---|---|---|---|---|---|
| pr1 | 1.2 | 1.5 | 2.3 | 2.6 | 1.4 | 1.6 | 1.8 | 1.4 | 1.2 |
| pr2 | 1.5 | 2.3 | 1.5 | 1.6 | 1.3 | 1.8 | 2.5 | 2.4 | 2.1 |
| pr3 | 2.3 | 1.4 | 1.6 | 1.2 | 2.1 | 2.2 | 2.1 | 1.2 | 1.5 |
| pr4 | 1.1 | 1.4 | 2.1 | 1.5 | 1.2 | 2.1 | 2.2 | 1.5 | 1.2 |
| ... | | | | | | | | | |

Figure 8B

| Probe (code) | Occlusion plane 1 params | Occlusion plane 2 params | Occlusion plane 3 params | visibility mask |
|---|---|---|---|---|
| 710 | xyz11 | xyz12 | xyz13 | 1001011 |
| pr2 | xyz21 | xyz22 | xyz23 | 0010010 |
| pr3 | xyz31 | xyz32 | xyz33 | 1011000 |
| pr4 | xyz41 | xyz42 | xyz43 | 0100010 |
| ... | | | | |

Figure 8C

VIRTUAL SCENE LIGHTING WITH LIGHT PROBE CULLING BASED UPON VISIBILITY

FIELD

The present invention relates generally to computer-aided graphics and, in particular, to methods, systems and computer-readable media for efficient use of computer resources when computing diffuse global illumination.

BACKGROUND

The use of light probes at discrete locations in a scene is a common and efficient way to estimate the diffuse global illumination at other points in the scene. Specifically, irradiance is sampled at each probe and encoded for each of a plurality of directions, and this pre-computed information is retrieved at run-time rather than being computed on the fly. If the point at which the diffuse global illumination is to be determined is located between multiple probes, the technical problem becomes one of selecting which probes are to be considered most influential to the computation of the diffuse global illumination. In this regard, known methods interpolate probes based on their proximity to the point of interest. However, this fails to take into consideration the effect of occlusion that certain elements in the scene may have, which results in certain nearby probes being unduly influential in their contribution to diffuse global illumination at certain points in the scene. As a result, the viewer may perceive unpleasant artifacts such as "popping".

SUMMARY OF THE INVENTION

According to a first aspect, the present invention seeks to provide a computer-implemented method for determining an illumination component for a selected point in a multi-dimensional space. The method comprises identifying a set of probes associated with the selected point, the probes located in the multi-dimensional space; for each selected one of the probes, determining which of a plurality of zones for the selected probe contains the selected point and determining visibility of said determined zone from the selected probe; and deriving an illumination component at the selected point by combining scene irradiance data associated with those of the probes from which the corresponding determined zone is determined to be visible.

According to a second aspect, the present invention seeks to provide a system for determining an illumination component for a selected point in a multi-dimensional space. The system comprises a processor; and a memory storing information identifying a plurality of probes in the multi-dimensional space and information associated therewith. The processor is configured for identifying a set of probes associated with the selected point, the probes located in the multi-dimensional space; for each selected one of the probes, determining which of a plurality of zones for the selected probe contains the selected point and determining visibility of said determined zone from the selected probe; and deriving an illumination component at the selected point by combining scene irradiance data associated with those probes from which the corresponding determined zone is determined to be visible.

According to a third aspect, the present invention seeks to provide a computer-readable medium comprising computer readable instructions which, when executed by a computing device, cause the computing device to execute a method for determining an illumination component for a selected point in a multi-dimensional space. The method comprises identifying a set of probes associated with the selected point, the probes located in the multi-dimensional space; for each selected one of the probes, determining which of a plurality of zones for the selected probe contains the selected point and determining visibility of said determined zone from the selected probe; and deriving an illumination component at the selected point by combining scene irradiance data associated with those probes from which the corresponding determined zone is determined to be visible.

According to a fourth aspect, the present invention seeks to provide a game apparatus, which comprises an input/output interface allowing a user to control game inputs and perceive game outputs; a memory storing (i) information associating a plurality of zones in a multi-dimensional space with corresponding sets of probes in the multi-dimensional space; (ii) executable instructions; and a processor configured for executing the executable instructions to derive an illumination component at each of a plurality of selected points in the multi-dimensional space from scene irradiance data associated with each of one or more probes from which a zone containing the selected point is visible, the one or more probes being selected from the set of probes corresponding to the zone.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 2C illustrates an example of a process of converting a 3D graphics scene to a game image for display on a display device.

FIG. 3 illustrates an offline process and a real-time process forming part of the game rendering processing function, in accordance with a non-limiting embodiment.

FIG. 4 illustrates sub-processes of the offline process of FIG. 3, in accordance with a non-limiting embodiment.

FIGS. 8A, 8B and 8C show various tables that can be pre-computed during the offline process and stored in memory before runtime, in accordance with a non-limiting embodiment.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
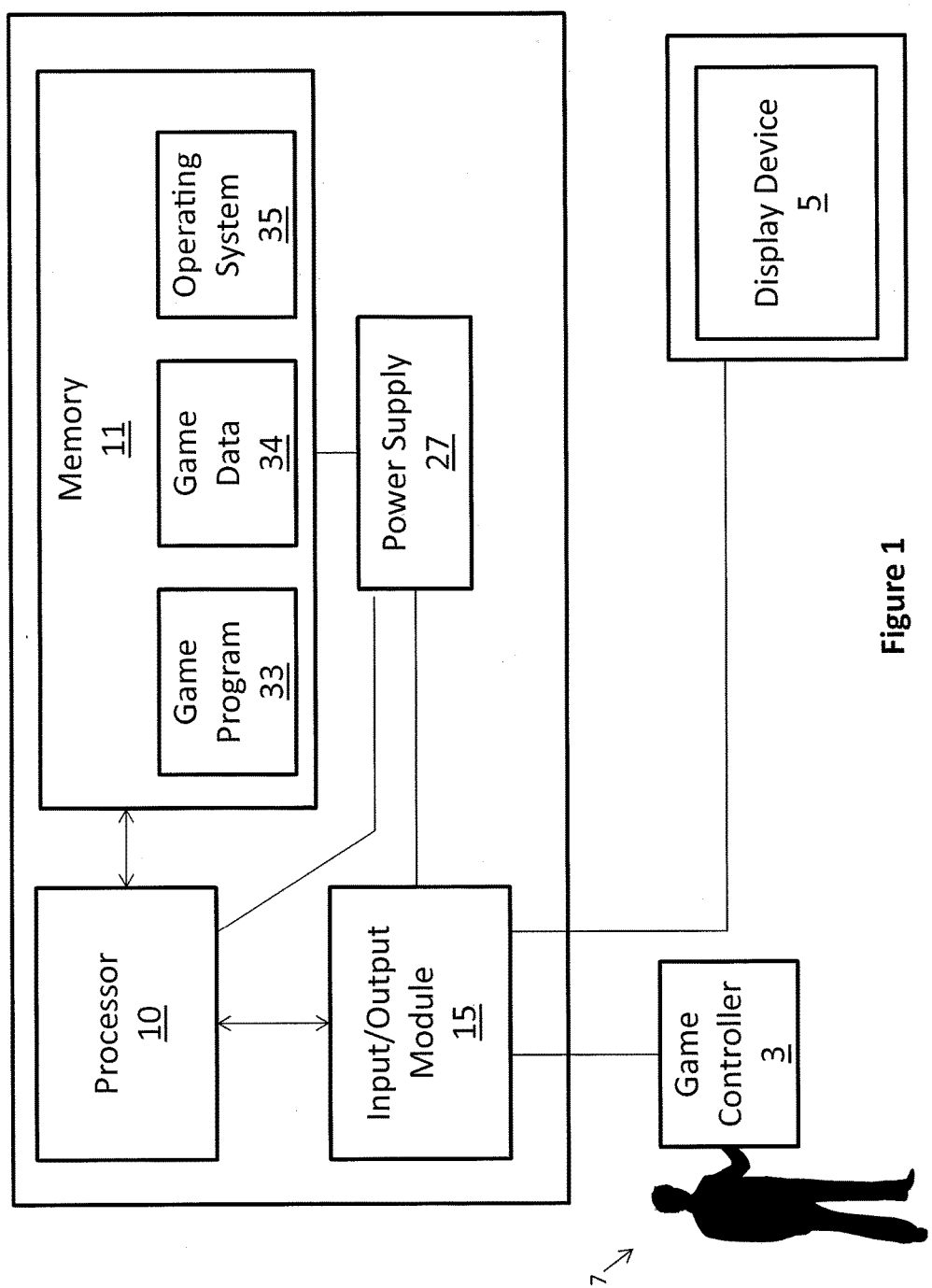
FIG. 1 is a block diagram illustrating a configuration of a game apparatus implementing an example non-limiting embodiment of the present invention.

FIG. 1 is a block diagram illustrating a configuration of a game apparatus 1 implementing an example non-limiting embodiment of the present invention. In some cases, the game apparatus 1 is a dedicated gaming console similar to an Xbox™ Playstation™, or Nintendo™ gaming console. In other cases, the game apparatus 1 is a multipurpose workstation or laptop computer. In still other cases, the game apparatus 1 is a mobile device such as a smartphone. In yet other cases, the game apparatus 1 is a handheld game console.

The game apparatus 1 includes at least one processor 10, at least one computer readable memory 11, at least one input/output module 15 and at least one power supply unit 27, and may include any other suitable components typically found in a game apparatus used for playing video games. The various components of the game apparatus 1 may communicate with each other over one or more buses, which can be data buses, control buses, power buses and the like.

As shown in FIG. 1, a player 7 is playing a game by viewing game images displayed on a screen of the display device 5 and controlling aspects of the game via a game controller 3. Accordingly, the game apparatus 1 receives inputs from the game controller 3 via the at least one input/output module 15. The game apparatus also supplies outputs to a display device 5 and/or an auditory device (e.g., a speaker, not shown) via the at least one input/output module 15. In other implementations, there may be more than one game controller 3 and/or more than one display device 5 connected to the input/output module 15.

The at least one processor 10 may include one or more central processing units (CPUs) having one or more cores. The at least one processor 10 may also include at least one graphics processing unit (GPU) in communication with a video encoder/video codec (coder/decoder, not shown) for causing output data to be supplied to the input/output module 15 for display on the display device 5. The at least one processor 10 may also include at least one audio processing unit in communication with an audio encoder/audio codec (coder/decoder, not shown) for causing output data to be supplied to the input/output module 15 to the auditory device.

The at least one computer readable memory 11 may include RAM (random access memory), ROM (read only memory), flash memory, hard disk drive(s), DVD/CD/Blu-Ray™ drive and/or any other suitable memory device, technology or configuration. The computer readable memory 11 stores a variety of information including a game program 33, game data 34 and an operating system 35.

When the game apparatus 1 is powered on, the processor 10 is configured to run a booting process which includes causing the processor 10 to communicate with the computer readable memory 11. In particular, the booting process causes execution of the operating system 35. The operating system 35 may be any commercial or proprietary operating system suitable for a game apparatus. Execution of the operating system 35 causes the processor 10 to generate images displayed on the display device 5, including various options that are selectable by the player 7 via the game controller 3, including the option for the player 7 to start and/or select a video game to be played. The video game selected/started by the player 7 is encoded by the game program 33.

The processor 10 is configured to execute the game program 33 such that the processor 10 is able to perform various kinds of information processing functions related to the video game that it encodes. In particular, and with reference to FIG. 2A, execution of the game program 33 causes the processor 10 to execute a game data processing function 22 and game rendering function 24, which are now described.

Figure 2A:
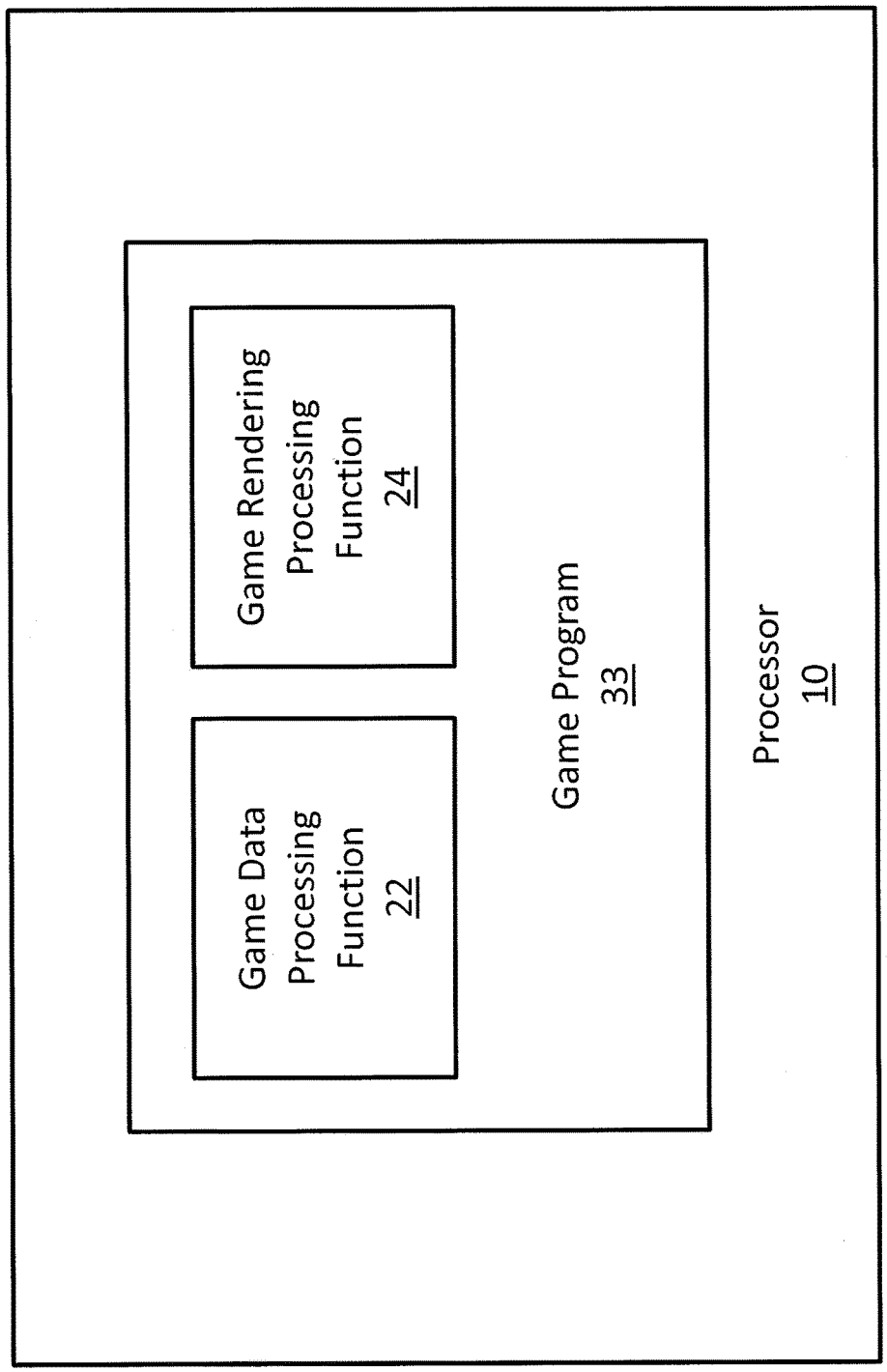
FIG. 2A shows components of a game program executed by the game apparatus of FIG. 1, including a game data processing function and a game rendering processing function.

The game rendering function 24 includes generation of a game image to be displayed on the display device 5. For its part, the game data processing function 22 includes processing of information representing progress of the game or a current state of the game (e.g., processing of information relating to the game that is not necessarily displayed on the display device 5). The game data processing function 22 and the game rendering function 24 are illustrated in FIG. 2A as forming part of a single game program 33. However, in other embodiments, the game data processing function 22 and the game rendering function 24 may be separate programs stored in separate memories and executed by separate, possibly distant, processors. For example, the game data processing function 22 may be performed on a CPU and game rendering function 24 may be performed on a GPU.

Figure 2B:
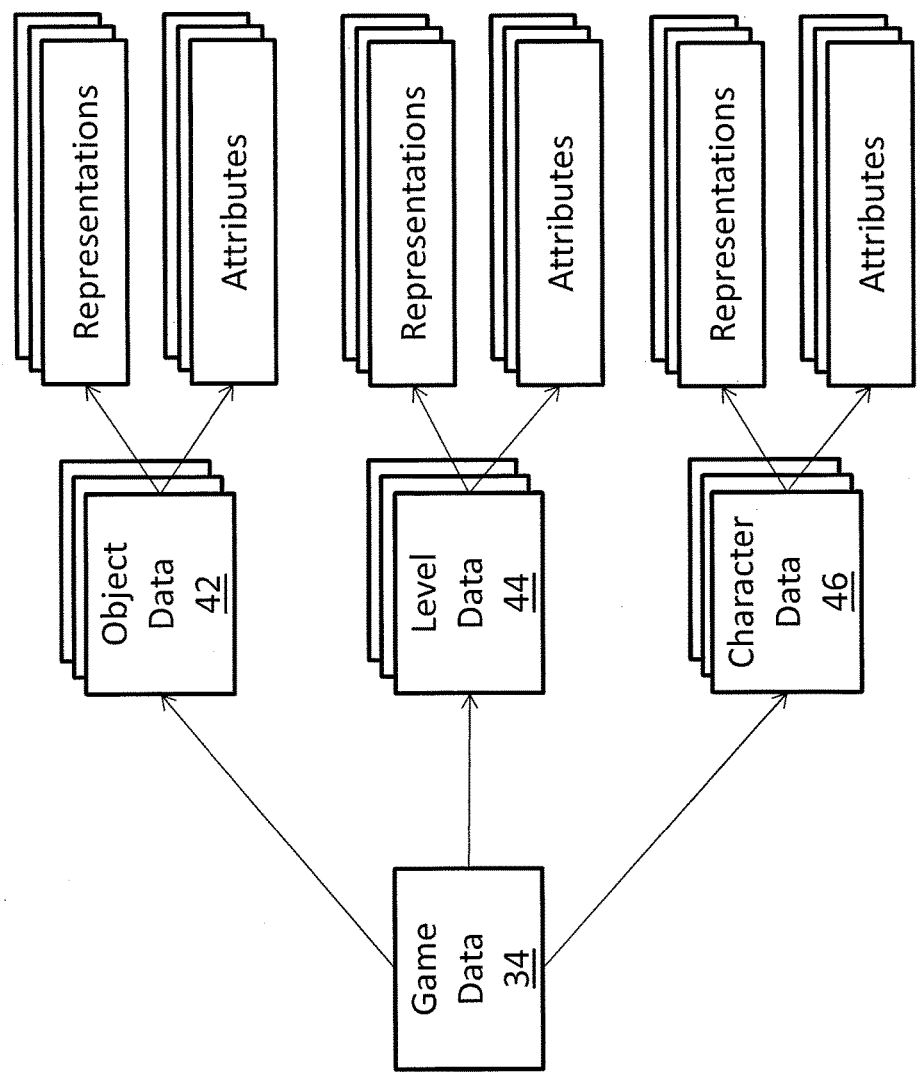
FIG. 2B shows examples of game data according to a present example embodiment.

In the course of executing the game program 33, the processor 10 manipulates constructs such as objects, characters and/or levels according to certain game rules and applying certain artificial intelligence algorithms. In the course of executing the game program 33, the processor 10 creates, loads, stores, reads and generally accesses the game data 34, which includes data related to the object(s), character(s) and/or level(s). FIG. 2B shows examples of game data 34 according to a present example embodiment. The game data 34 may include data related to the aforementioned constructs and therefore may include object data 42, character data 46 and/or level data 44.

An object may refer to any element or portion of an element in the game environment that can be displayed graphically in a game image frame. An object may include three-dimensional representations of buildings, vehicles, furniture, plants, sky, ground, ocean, sun, and/or any other suitable elements. The object may have other non-graphical representations such as numeric, geometric or mathematical representations. The object data 42 stores data relating to the current representation of the object such as the graphical representation in a game image frame or a numeric, geometric or mathematical representation. The object data 42 may also store attributes such as imaging data, position data, material/texture data, physical state data, visibility data, lighting data (e.g., direction, position, color and/or intensity), sound data, motion data, collision data, environment data, timer data and/or other data associated with the object.

A character is similar to an object except that the attributes are more dynamic in nature and it has additional attributes that objects typically do not have. For example, certain attributes of a playing character may be controlled by the player 7. Certain attributes of a character that is a non-playing character (NPC) may be controlled by the game program 33. Examples of characters include a person, an avatar, an animal, and/or any other suitable object. The character may have other non-visual representations such as numeric, geometric or mathematical representations. A character may be associated with one or more objects such as a weapon held by a character or clothes donned by the character. The character data 46 stores data relating to the current representation of the character such as the graphical representation in a game image frame or a numeric, geometric or mathematical representation. The character data 46 may also store attributes such as imaging data, position data, material/texture data, physical state data, visibility data, lighting data (e.g., direction, position, color and/or intensity), sound data, motion data, collision data, environment data, timer data and/or other data associated with the character.

A level may refer to a specific arrangement of objects within the game environment, through which the characters must navigate. A level may include data regarding paths that may be traveled by characters. A level may also include data that encodes objectives, goals, challenges or puzzles involving the characters and the objects. Although a level has a graphical representation the can be rendered and displayed on a two-dimensional display device such as the display device 5, a level may have other non-visual representations such as numeric, geometric or mathematical representations. Also, there may be multiple levels, each with their own level data 44.

The game data 34 may also include data relating to the current view or camera angle of the game (e.g., first-person view, third-person view, etc.) as displayed on the display device 5 which may be part of the representations and/or attributes of the object data 42, level data 44 and/or character data 46.

In executing the game program 33, the processor 10 may cause an initialization phase to occur after the player 7 has selected/started the game, causing initialization of the game. The initialization phase is used to carry out any necessary game setup and prepare the game data 34 for the start of the game. The game data 34 changes during the processing of the game program 33 (i.e., during the playing of the game) and the terminology "game state" is used herein to define the current state or properties of the game data 34 and hence the various object data 42, character data 46 and/or level data 44 and their corresponding representations and/or attributes.

After the initialization phase, the processor 10 in execution of the game program 33 may implement one or more game loops. The one or more game loops run continuously during gameplay causing the game data processing function 22 and the game rendering function 24 to be routinely performed.

A game loop may be implemented where the game data processing function 22 is performed to process the player's input via the game controller 3 and update the game state and afterwards the game rendering function 24 is performed to cause the game image to be rendered based on the updated game state for display on the display device 5. The game loop may also track the passage of time to control the rate of gameplay. It should be appreciated that parameters other than player inputs can influence the game state. For example, various timers (e.g., elapsed time, time since a particular event, virtual time of day, etc.) can have an effect on the game state. In other words, the game keeps moving even when the player 7 isn't providing input and as such the game state may be updated in the absence of the player's input.

In general, the number of times the game data processing function 22 is performed per second specifies the updates to the game state per second (hereinafter "updates per second") and the number of times the game rendering function 24 is performed per second specifies game image rendering per second (hereinafter "frames per second"). In theory the game data processing function 22 and the game rendering function 24 would be called the same number of times per second. By way of a specific and non-limiting example, if the target is 25 frames per second, it would be desirable to have the game data processing function 22 and the game rendering function 24 both being performed every 40 ms (i.e., 1 s/25 FPS). In the case where the game data processing function 22 is performed and afterwards the game rendering function 24 is performed, it should be appreciated that both the game data processing function 22 and the game rendering function 24 would need to be performed in the 40 ms time window. Depending on the current game state, it should be appreciated that the time of performing the game data processing function 22 and/or the game rendering function 24 may vary. If both the game data processing function 22 and the game rendering function 24 take less than 40 ms to perform, a sleep timer may be used before performing the next cycle of the game data processing function 22 and the game rendering function 24. However, if the game data processing function 22 and the game rendering function 24 take more than 40 ms to perform for a given cycle, one technique is to skip displaying of a game image to achieve a constant game speed.

It should be appreciated that the target frames per second may be more or less than 25 frames per a second (e.g., 60 frames per second); however, it may be desired that the game data processing function 22 and the game rendering function 24 be performed not less than 20 to 25 times per second so that the human eye won't notice any lag in the rendering of the game image frames. Naturally, the higher the frame rate, the less time between images and the more powerful the processor(s) required to execute the game loop, hence the reliance on specialized processor such as GPUs.

In other embodiments, the game data processing function 22 and the game rendering function 24 may be executed in separate game loops and hence by independent processes. In such cases, the game data processing function 22 may be routinely performed at a specific rate (i.e., a specific number of updates per second) regardless of when the game rendering function 24 is performed and the game rendering function 24 may be routinely performed at a specific rate (i.e., a specific number of frames per second) regardless of when the game data processing function 22 is performed.

It should be appreciated that the process of routinely performing the game data processing function 22 and the game rendering function 24 may be implemented according to various techniques within the purview of the person skilled in the art and that the techniques described in this document are non-limiting examples of how the game data processing function 22 and the game rendering function 24 may be performed.

When the game data processing function 22 is performed, the player input received via the controller 3 (if any) and the game data 34 is processed. More specifically, as the player 7 plays the video game, the player 7 inputs various commands via the game controller 3 such as move left, move right, jump, shoot, to name a few examples. In response to the player input, the game data processing function 22 may update the game data 34. In other words, the object data 42, level data 44 and/or character data 46 may be updated in response to player input via the game controller 3. It should be appreciated that not every time the game data processing function 22 is performed will there be player input via the game controller 3. Regardless of whether player input is received, the game data 34 is processed and may be updated. Such updating of the game data 34 may be in response to representations and/or attributes of the object data 42, level data 44 and/or character data 46, as the representations and/or attributes may specify updates to the game data 34. For example, timer data may specify one or more timers (e.g., elapsed time, time since a particular event, virtual time of day, etc.), which may cause the game data 34 (e.g., the object data 42, level data 44 and/or character data 46) to be updated. By way of another example, objects not controlled by the player 7 may collide (bounce off, merge, shatter, etc.), which may cause the game data 34 e.g., the object data 42, level data 44 and/or character data 46 to be updated in response to a collision.

In general the game data 34 (e.g., the representations and/or attributes of the objects, levels, and/or characters) represents data that specifies a three-dimensional (3D) graphics scene of the game. The process of converting a three-dimensional (3D) graphics scene, which may include one or more 3D graphics objects, into two-dimensional (2D) rasterized game image for display on the display device 5 is generally referred to as rendering. FIG. 2C illustrates an example process of converting a 3D graphics scene to a game image for display on the display device 5 via the screen. At step 52, the game data processing function 22 processes the data that represents the three-dimensional (3D) graphics scene of the game and converts this data into a plurality of vertex data. The vertex data is suitable for processing by a rendering pipeline 55 (also known as a graphics pipeline). At step 55, the game rendering function 24 processes the vertex according to the rendering pipeline 55. The output of the rendering pipeline 55 is typically pixels for display on the display device 5 via the screen, step 60.

More specifically, at step 52, the 3D graphics objects in the graphics scene may be subdivided into one or more 3D graphics primitives. A primitive may refer to a group of one or more vertices that are grouped together and/or connected to define a geometric entity (e.g., point, line, polygon, surface, object, patch, etc.) for rendering. For each of the 3D graphics primitives, vertex data is generated at this step. The vertex data of each primitive may include one or more attributes (e.g., position, the color, normal or texture coordinate information, etc.). In deriving the vertex data, a camera transformation (e.g., rotational transformations) may occur to transform the 3D graphics objects in the 3D graphics scene to the current view or camera angle. Also, in deriving the vertex data, light source data (e.g., direction, position, color and/or intensity) may be taken into consideration. The vertex data derived at this step is typically an ordered list of vertices to be send to the rendering pipeline 55. The format of the ordered list typically depends on the specific implementation of the rendering pipeline 55.

At step 55, the game rendering function 24 processes the vertex data according to the rendering pipeline 55. Rendering pipelines are known in the art (e.g., OpenGl, DirectX, etc.); regardless of the specific rendering pipeline used to implement the rendering pipeline 55, the general process of the rendering pipeline 55 is to create a 2D raster representation (e.g., pixels) of a 3D scene. The rendering pipeline 55, in general, calculates the projected position of the vertex data into two-dimensional (2D) screen space and performs various processing which may take into consideration lighting, colour, position information, texture coordinates and/or any other suitable process to derive the game image (e.g., pixels) for output on the display 5 (step 60).

In some cases, the game apparatus 1 is distributed between a server on the internet and one or more internet appliances. Plural players may therefore participate in the same online game, and the functionality of the game program (the game rendering function and/or the game data processing function) may be executed, at least in part, by the server.

One of the objectives of the rendering process is to compute the local (direct) illumination and global (or indirect) illumination for a point in multi-dimensional space, such as two-dimensional space or three-dimensional space, to name two non-limiting examples. The local illumination component may be computed in real-time. In the case of global (indirect) illumination, there is a specular component and a diffuse component. To compute the specular component of the global illumination for a point, the camera position is relevant, whereas to compute the diffuse component, the camera position can be ignored; what is relevant are the local surface properties of the point (i.e., its normal). For added efficiency, one manner of computing the diffuse component of the global illumination relies on a weighted combination of the diffuse light picked up by multiple light probes (or simply "probes").

Probes are locations in the multi-dimensional space where diffuse global illumination is sampled, pre-computed by the processor 10 and stored in the memory 11. Specifically, irradiance is sampled at the location of each probe in a variety of directions and this information is encoded into coefficients (hereinafter "SH coefficients") of corresponding "spherical harmonic basis functions" that can then be evaluated for an arbitrary direction. Spherical harmonic basis functions are an infinite series of functions, which is cut off at "bands", with the $B^{th}$ band adding 2B+1 values to the series. Empirically, the lone SH coefficient for band 0 may be considered as an ambient occlusion term and the three SH coefficients for band 1 could be considered as bent normals. Each subsequent band adds detail. Bands are gathered by "order", where order O means the set of all bands up to O−1, so order 1 requires 1 SH coefficient, order 2 needs 4 SH coefficients, order 3 needs 9 SH coefficients ($SH_{00}$, $SH_{11}$, $SH_{10}$, $SH_{1-1}$, $SH_{21}$, $SH_{2-1}$, $SH_{2-2}$, $SH_{20}$, $SH_{22}$) and so on.

Spherical harmonic basis functions $Y_{lm}$, with $l \geq 0$ and $-l \leq m \leq l$, are the analogues on the sphere to the Fourier basis on the line or circle. The first 9 spherical harmonics (with $l \leq 2$) are simply constant (l=0), linear (l=1), and quadratic (l=2) polynomials of the Cartesian components (x, y, z), and are given numerically by:

$$Y_{00}(\theta,\varphi)=0.282095$$

$$Y_{11}(\theta,\varphi)=0.488603x$$

$$Y_{10}(\theta,\varphi)=0.488603z$$

$$Y_{1-1}(\theta,\varphi)=0.488603y$$

$$Y_{21}(\theta,\varphi)=1.092548xz$$

$$Y_{2-1}(\theta,\varphi)=1.092548yz$$

$$Y_{2-2}(\theta,\varphi)=1.092548xy$$

$$Y_{20}(\theta,\varphi)=0.315392(3z^2-1)$$

$$Y_{22}(\theta,\varphi)=0.546274(x^2-y^2),$$

where $x=\sin\theta\cos\varphi$, $y=\sin\theta\sin\varphi$ and $z=\cos\theta$.

Thus, spherical harmonics are useful because they can capture the low frequency directionality of irradiance using only a few basis functions and corresponding SH coefficients. In practice, it is observed that order 3 (shown above) provides satisfactory performance, but this is to be considered neither an upper nor a lower limit for an acceptable order of the spherical harmonic basis functions (and SH coefficients) that may be used with the present invention. Further information regarding spherical harmonics may be found in Ravi Ramamoorthi and Pat Hanrahan, "An Efficient Representation for Irradiance Environment Maps", Siggraph 2001, hereby incorporated by reference herein.

Figure 10:
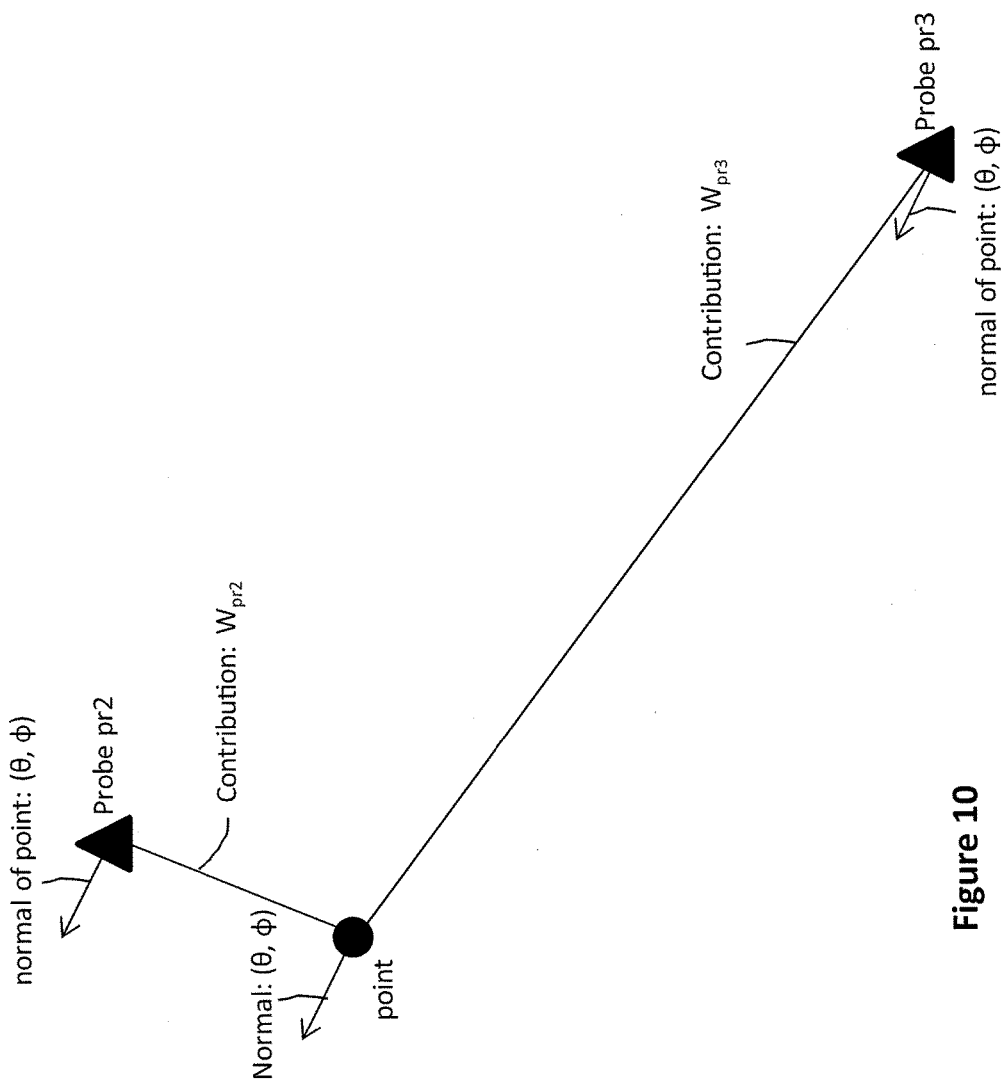
FIG. 10 illustrates a point for which diffuse global illumination is influenced by two probes, in accordance with a non-limiting embodiment.

The SH coefficients of the spherical harmonic basis functions encode the manner in which irradiance changes with direction (orientation). Specifically, if a certain point in the multi-dimensional space would occupy the very location of a probe, and if that point had an orientation defined by a particular normal, the diffuse global illumination present at that point could be approximated by the output of the diffuse global illumination calculation, as determined by the spherical harmonic basis functions evaluated for the particular normal, in the proportions defined by the SH coefficients. On the other hand, and with reference to FIG. 10, if the certain point is at a non-zero distance between multiple probes (in this case two probes, pr2 and pr3), the spherical harmonic basis functions ($Y_{lm}(\theta, \varphi)$) can be evaluated for the particular normal, scaled by the corresponding SH coefficients (for order 3: $SH_1 \ldots SH_9$ for each probe), and then the results for multiple probes are weighted according to the importance of each probe ($W_{pr2}$, $W_{pr3}$) and added in order to give the blended diffuse global illumination at the certain point:

Diffuse global illumination at point having normal $(\theta, \varphi)=$ $Wpr2*((SH_{00}(pr2)*Y_{00}(\theta,\varphi))+(SH_{11}(pr2)*Y_{11}(\theta,\varphi))+$
$\quad \ldots +(SH_{22}(pr2)*Y_{22}(\theta,\varphi)))+$ $Wpr3*((SH_{00}(pr3)*Y_{00}(\theta,\varphi))+(SH_{11}(pr3)*Y_{11}(\theta,\varphi))+$
$\quad \ldots +(SH_{22}(p32)*Y_{22}(\theta,\varphi)))$.

Alternatively, the SH coefficients for a particular spherical harmonic basis function but from multiple probes can be weighted on a per-probe basis and added together, to give one blended SH coefficient of the particular spherical harmonic basis function, and the blended coefficients then define the proportions of the spherical harmonic basis functions evaluated for the particular normal:

Diffuse global illumination at point having normal$(\theta, \varphi) =$ $((Wpr2*SH_{00}(pr2) + Wpr3*SH_{00}(pr3))*Y_{00}(\theta, \varphi)) +$ $((Wpr2*SH_{11}(pr2) + Wpr3*SH_{11}(pr3))*Y_{11}(\theta, \varphi)) + \ldots +$ $((Wpr2*SH_{22}(pr2) + Wpr3*SH_{22}(pr3))*Y_{22}(\theta, \varphi)). =$ $SH'_{00}*Y_{00}(\theta, \varphi)) + SH'_{11}*Y_{11}(\theta, \varphi) + \ldots + SH'_{22}*Y_{22}(\theta, \varphi)$.

Those skilled in the art will appreciate that alternatives to spherical harmonics may be used, including cube maps, spherical Gaussians or other spherical functions. Also, the SH coefficients can be referred to more generally as irradiance parameters and may be placed in an array stored in the memory 11.

Although the number of probes in the multi-dimensional space may be large (up to several thousand or more), not all probes contribute significantly to the diffuse global illumination at each point. Deciding which probes contribute most and which probes can be ignored is a non-trivial technical problem. For example, when the scene geometry is intricate, it is not necessarily the case that the closest probes (distance-wise) are the ones that contribute most significantly to the diffuse global illumination. A judicious but efficient technical process is therefore needed for selecting which probes to utilize in the computation of diffuse global illumination and how to weight them. To this end, the processor 10, in accordance with a non-limiting embodiment of the invention, may implement a set of processes that can be described with the aid of FIG. 3, which illustrates an offline process 400 and a real-time process 500.

The offline process 400 can be performed ahead of time and does not need to be performed during real-time rendering. By way of non-limiting example, and with reference to FIG. 4, the offline process 400 can include three offline sub-processes 410, 420, 430. The order in which the offline sub-processes are carried out is not important. Nor is it crucial that they be carried out separately from the real-time process 500, as the processor 10 may have sufficient processing power to carry out one or more of the offline sub-processes during real-time rendering. A description of the offline sub-processes 410, 420, 430 is now provided.

Figure 9:
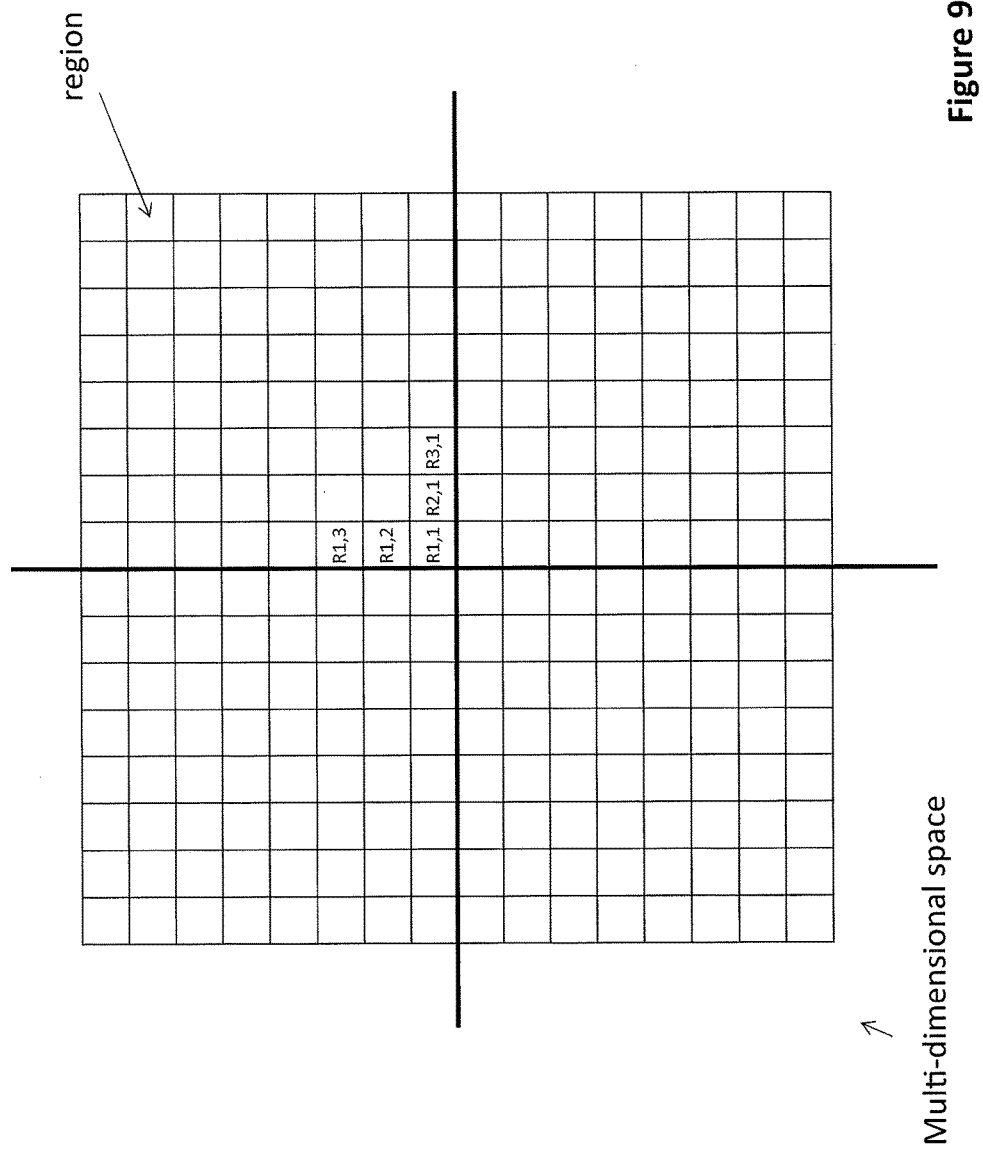
FIG. 9 shows subdivision of a space into regions, in accordance with a non-limiting embodiment.

Sub-process 410: With reference to FIG. 9, the multi-dimensional space is subdivided into regions, e.g., according to a regular hierarchical grid (R1,1, R1,2, R1,3, . . . ). Other subdivisions are of course possible. Each region may contain numerous points. For each region, the processor 10 generates a set of potentially influential probes. Specifically, for each region, the processor 10 identifies probes that may potentially, although not necessarily, have influence on the diffuse global illumination in that region, based on factors such as distance between the region and the probe, and the probe's radius (or sphere of influence). With reference to FIG. 8A, potentially influential probes may be identified by their spatial coordinates or by a code, and this information is stored in the memory 11, in association with the coordinates of the corresponding region in multi-dimensional space.

For any given region, the set of potentially influential probes is expected to include less than all of the probes in the multi-dimensional space. In a non-limiting embodiment, the number of potentially influential probes for a given region may vary from, say, 8 to 20. However, this does not represent a limitation of the present invention, as fewer than 8 or more than 20 probes may potentially influence the diffuse global illumination at a given region in the multi-dimensional space.

Sub-process 420: For each probe in the multi-dimensional space, the processor 10 computes the SH coefficients, i.e., the coefficients of the spherical harmonic basis functions. This information is obtained by sampling the diffuse global illumination for multiple orientations and applying a transformation in order to determine the appropriate SH coefficients. One non-limiting example technique for determining the SH coefficients can be based on pp. 8-9 of the article "Stupid Spherical Harmonics (SH) Tricks" by Peter-Pike Sloan, © 2008 (section entitled "Irradiance Environment Maps"), hereby incorporated by reference herein. The number of SH coefficients computed is a function of the order. With reference to FIG. 8B, the SH coefficients for a particular probe may be stored in the memory 11 as an array corresponding to identifying information for the particular probe, such as spatial coordinates or a code (see "probe codes" pr1, pr2, . . . , pr4 in FIG. 8C) which itself points to a set of spatial coordinates.

Sub-process 430: For each probe in the multi-dimensional space, the processor 10 determines a "visibility mask". To this end, consider that there may be elements in the multi-dimensional space that provide occlusion, referred to as "occluding elements". Examples of occluding elements include walls, ceilings, floors, doors, vehicles, etc.

It is expected that the irradiance at a given point in the vicinity of an occluding element would be influenced less by a probe that is hidden by such an occluding element than one that is not.

Accordingly, in a non-limiting embodiment of the present invention, a set of N "occlusion planes" is defined for each probe. In a non-limiting embodiment, each occlusion plane may be defined by the coordinates of a point in the plane and the parameters of a normal to the plane, or by specifying the coordinates of three points in the plane. Other techniques for specifying a plane will be known to those skilled in the art.

The N occlusion planes yield a total of up to a maximum of P(N) "zones" per probe. In an embodiment, $P(N)=2^N$, but this does not need to be the case in all embodiments. Some of these zones may be visible from the probe, while some may not. A visibility mask is used to represent those of the P(N) zones that are visible from the probe. Specifically, the visibility mask may be a binary string of P(N) bits, where the position of a bit indicates the zone and the value of the bit in that position indicates whether the zone is visible from the probe.

Figure 7:
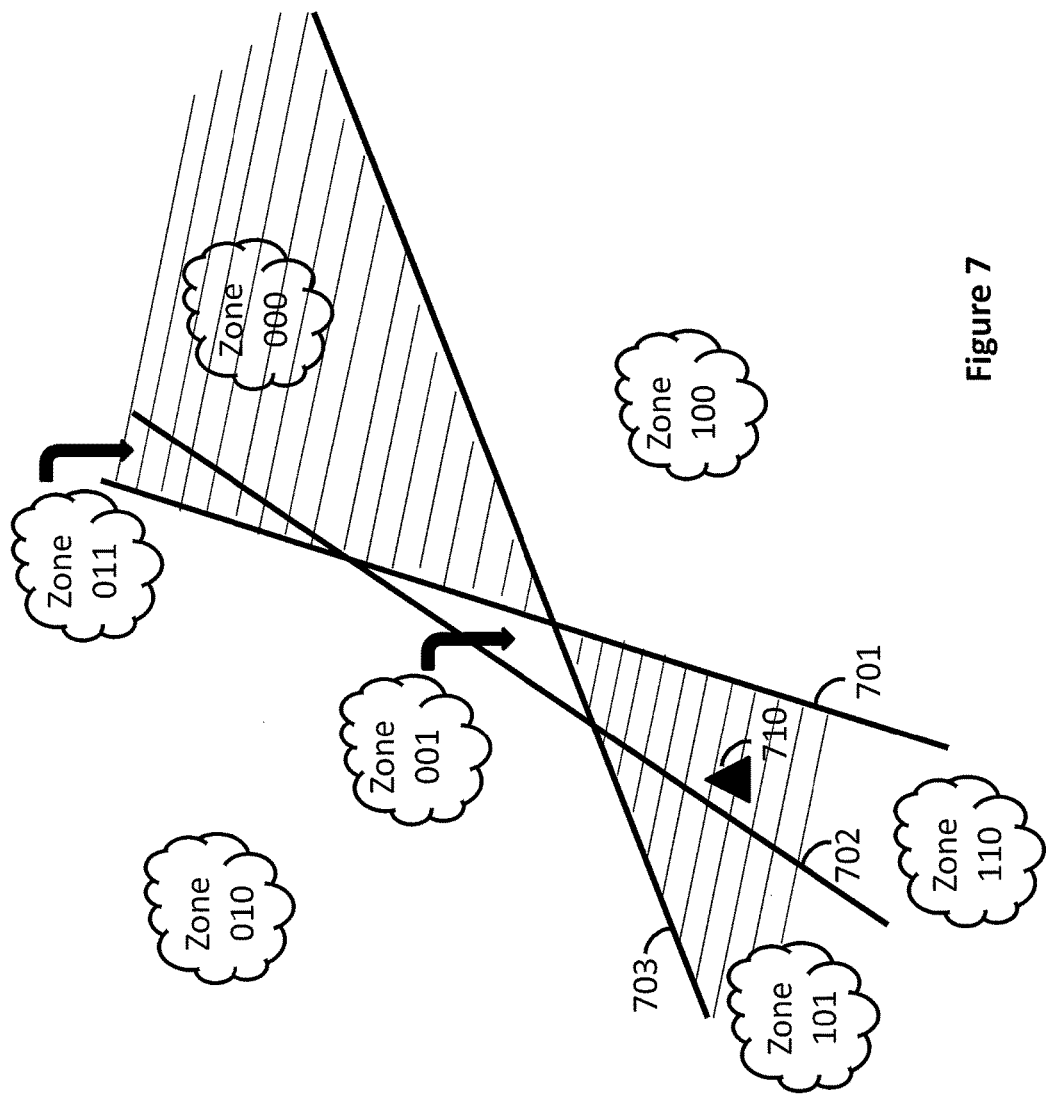
FIG. 7 illustrates the division of a space into zones that may or may not be visible from a probe, in accordance with a non-limiting embodiment.

For example, and with reference to FIG. 7 (which for simplicity illustrates a two-dimensional space), consider the case where N=3, i.e., there are three (N=3) occlusion planes 701, 702, 703 for a given probe resulting in the creation of seven zones, which are ordered (the first zone being denoted 000, the second zone being denoted 001, etc.). Thus it is seen that, in this example, there are seven zones for 3 occlusion planes in a 2D space. For a 3D space there could be up to 8 zones for 3 occlusion planes.

As such, in the context of the example of FIG. 7, where there are 7 zones, the visibility mask is a 7-bit number. Consider now the illustrated example where there is a probe 710 (which happens to be located in zone 110) and where zones 000, 011, 101 and 110 are visible from probe 710, whereas the other zones are not visible from probe 710. This would mean that the visibility mask for the given probe could be represented as the 7-bit number "1001011", where the bit in position x indicates whether zone x (the decimal equivalent to the 3-digit binary code corresponding to the zone) is visible from probe 710. It is noted that, for a given probe, some of the visible zones may be, adjacent to one another in the multi-dimensional space. In other cases, none of the visible zones may be adjacent to one another (e.g., as would be the case with zones 011 and 110 in FIG. 7, for example).

It should be appreciated that the zones (of which there may be up to $P(N)=2^N$, although there may be fewer) may be ordered in a certain standardized way, for consistency. For example, they may be ordered clockwise or counter clockwise from an agreed intersection point or center of mass, or according to size, etc. Certain approaches will be more efficient (less costly) from a computational standpoint than others and are generally preferred. For example, one computationally efficient ordering scheme is to associate the zones according to their positions relative to each occlusion plane. The position relative to an occlusion plane could be binary, namely on the "front side" of that occlusion plane (e.g., a value of 0) or "behind" that occlusion plane (e.g., a value of 1).

Whether or not a zone is on the "front side" of a particular occlusion plane can be determined by computing a 4D dot product of a point (x, y, z, 1) within the zone with the occlusion plane represented by a 4D vector (nx, ny, nz, d). The sign (positive or negative) of the result indicates whether the zone is in front or behind the occlusion plane.

Thus, by concatenating the binary value obtained by performing the above computation for each of N occlusion planes, one obtains an N-bit number that represents the encoded number of the zone, between 0 and $2^N$.

In the case of 3 occlusion zones in a two-dimensional space, there is actually a maximum total of 7 zones ($7<P(N)=2^3$), meaning that there will be one 3-bit binary combination that does not represent a unique zone and does not exist. This is the case with the combination "111" in FIG. 7, which represents a non-existent zone and, as such, the visibility mask is a 7-bit number, rather than an 8-bit number.

With reference to FIG. 8C, the parameters corresponding to the N occlusion planes (in this case N=3) for each particular probe, as well as the visibility mask of 7 bits, may be stored in the memory 11 as an array corresponding to identifying information, for each particular probe, such as spatial coordinates or a code which itself points to a set of spatial coordinates. Here is seen that probe 710 is associated with visibility mask "1001011".

It should be understood that while in this example, the occlusion planes have been defined in two-dimensional space (where they may be alternatively referred to as "occlusion axes"), they could also be defined in three-dimensional space. Analogously, the zones created by the occlusion axes or planes may consequently be defined in two-dimensional or three-dimensional space, respectively.

Figure 5:
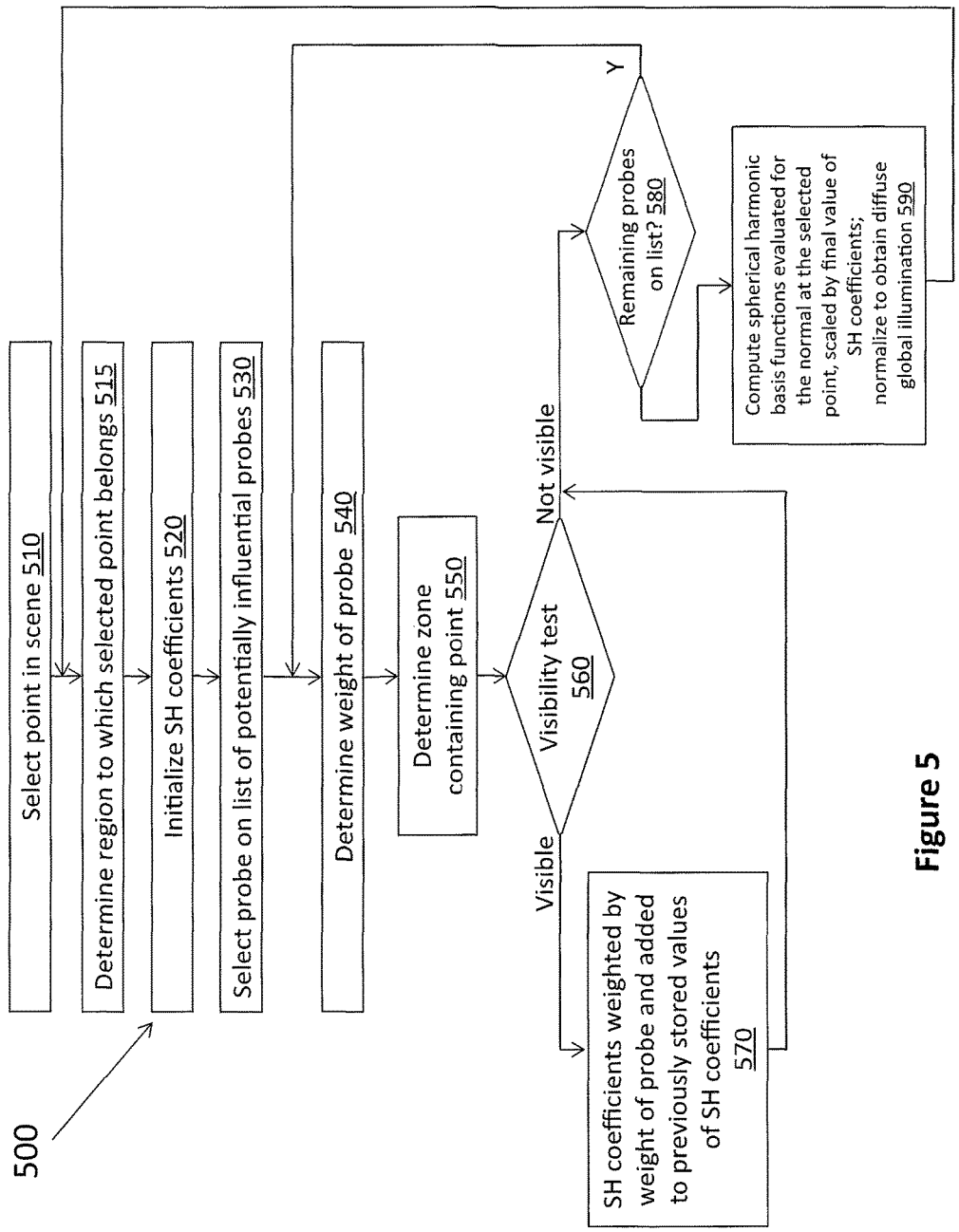
FIG. 5 is a flowchart showing steps in operation of the real-time process of FIG. 3, in accordance with a non-limiting embodiment.

The real-time process 500 may then be executed by the processor 10 for each point to be rendered. The real-time process may be performed for each point in a scene to be rendered, once per frame. The term "real-time" is used merely to distinguish this process from the offline process 400 but this does not necessarily require that the real-time process 500 be performed in real time, although it may be. The real-time process 500 is now described with reference to a set of steps shown in FIG. 5. The existence of an order in the below description does not imply that the order must be followed, as some steps may be performed in a different order.

Step 510: The processor 10 selects a point in the scene to be rendered.

Step 515: The processor 10 determines the region (e.g., according to the grid as in FIG. 9) to which the selected point belongs.

Step 520: The processor 10 initializes the SH coefficients to zero.

Step 530: The processor 10 consults the set of potentially influential probes for the region (which may have been pre-calculated as a result of the offline sub-process 430; see also FIG. 8A) and a first probe from the set is selected (the "selected probe").

Step 540: The processor 10 determines a weight for the selected probe (as it relates to the selected point). The weight could be based in part on relative proximity (distance) to the selected point. The weight could also be such that the weight for the selected probe is not proportional to its distance to the selected point, compared to other probes in the set. The weight could also be based on other factors, such as probe radius, and/or the orientation between the selected point and the probe.

Step 550: The processor 10 now determines the zone to which the point belongs, based on the occlusion planes for the selected probe. It is recalled that there are N occlusion planes per probe. As such, a binary tree method may be used. Accordingly, for example, the processor 10 consults the memory 11 and a first occlusion plane for the selected probe is selected. The processor 10 determines whether or not the selected point is on the "front side" of the selected occlusion plane for the selected probe. This can be determined by computing a four-dimensional dot product of the point (x, y, z, 1) with the selected occlusion plane represented with a 4D vector (nx, ny, nz, d). The sign (positive or negative) of the result indicates which of two sub-sets of zones the selected point is located in (i.e., in front or behind). This operation is then performed for the remaining N−1 occlusion planes for the selected probe, resulting in the identification of one of P(N) zones to which the selected point belongs.

In a non-limiting embodiment, the zone to which the selected zone belongs is encoded as a binary string of P(N) bits, where only one of the bit positions is a 1 (corresponding to the zone containing the selected point) and the rest are 0. The bit position corresponding to a specific zone for the selected probe is the same as the bit position corresponding to that specific zone when constructing the visibility mask for the selected probe (see sub-process 420).

Step 560: The processor 10 conducts a "visibility test" in order to determine whether the selected probe should have influence on the diffuse global illumination at the selected, point. Specifically, this step determines whether the zone to which the selected point belongs is visible from the selected probe. If the zone is visible by the selected probe, the probe can be referred to as a "sighted" probe, which is in contrast to a blind probe that would not be capable of "seeing" the zone.

Figure 6A:
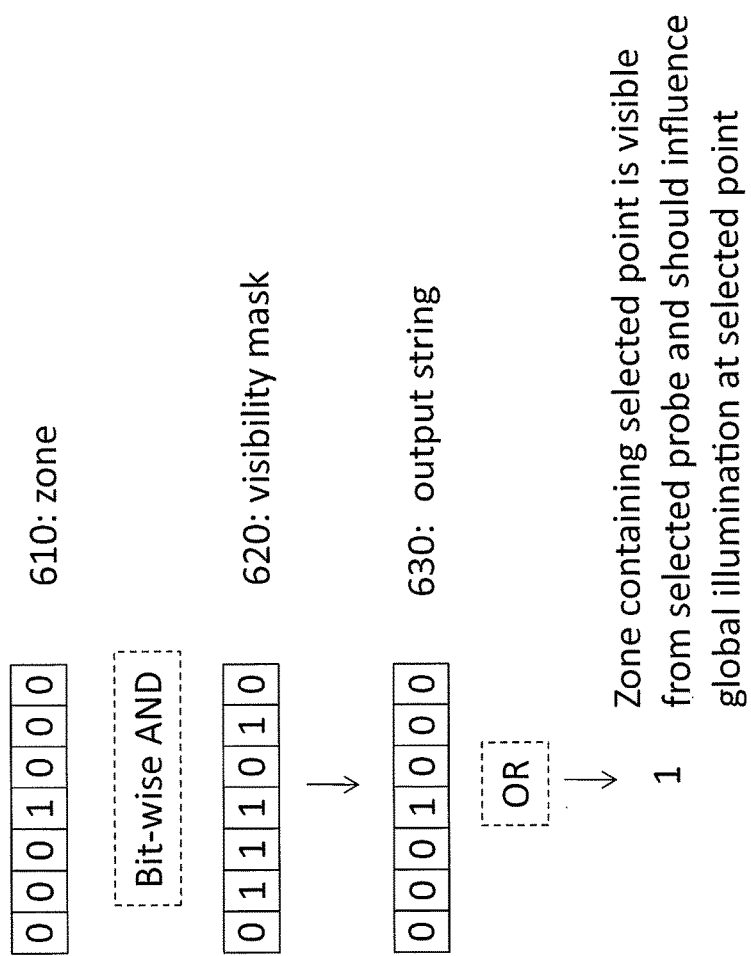
FIGS. 6A and 6B conceptually illustrate a visibility test performed as part of the real-time process of FIG. 5, in accordance with a non-limiting embodiment.
Figure 6B:
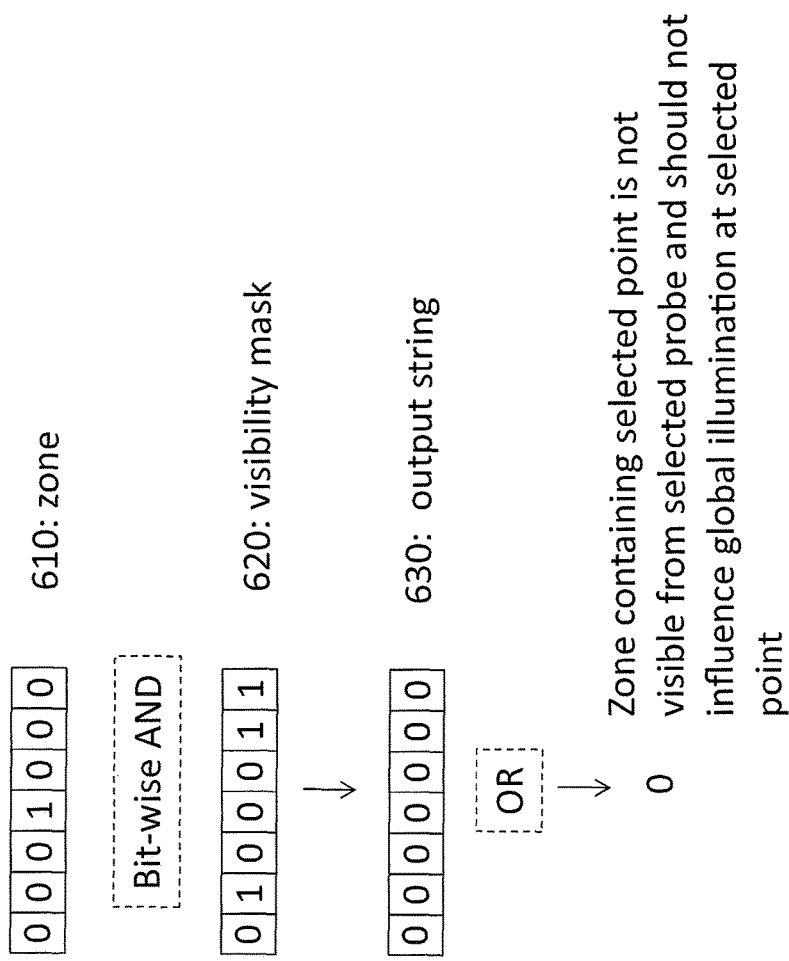

In a non-limiting embodiment, with reference to FIGS. 6A and 6B, the binary string produced at the output of step 530 (which has a 1 in the position corresponding to the zone containing the selected point and 0's elsewhere), denoted 610, is compared with the binary string that represents the visibility mask for the selected probe computed by sub-process 420 (which has 1's in the positions corresponding to the zones that are visible from the selected probe), denoted 620. By way of non-limiting example, the comparison between binary strings 610 and 620 can be a bit-wise logical "AND", resulting in a binary output string 630, that will either retain a 1 in the position corresponding to the zone to which the selected point belongs (which, as seen in FIG. 6A, would signify that the selected probe is a "sighted" probe and thus should influence the diffuse global illumination at the selected point, the next step being step 570) or will be made up of all 0's (which, as seen in FIG. 6B, would signify that the selected probe is a "blind" probe and thus should NOT influence the diffuse global illumination at the selected point, the next step being step 580). One simple, non-limiting way of determining whether the output string 630 includes a one or is all zeros is to test against zero (i.e., result !=0).

Step 570: The processor 10 adds each of the SH coefficients for the selected point to the respective previously stored values of the SH coefficients (which will be zero on the first pass through the real-time process 500). The processor 10 also performs weighting, according to the weight corresponding to the selected probe (see step 540). In a non-limiting embodiment, order 3 spherical harmonic basis functions may be used, which implies that there are 9 spherical harmonic basis functions and therefore 9 SH coefficients for each color space channel. Thus, for the RGB color space, there would be a total of 27 SH coefficients. In another implementation, the YCgCo or YCbCr color space is used, where Y is the luminance and Cg and Co are the chrominance. In this case, 9 SH coefficients (order 3 spherical harmonics) are used for Y and 4 SH coefficients (order 2 spherical harmonics) are used for each of Cg and Co, for a total of 17 SH coefficients.

Step 580: The processor 10 verifies whether there are any remaining probes on the set of potentially influential probes for the selected point. If yes, the processor 10 selects the next probe on the set and returns to step 540. If not, the processor 10 proceeds to step 590.

Step 590: The processor 10 now has a final "blended" value for each of the various SH coefficients ($SH_{00}'$, $SH_{11}'$, ... , $SH_{22}'$), which takes into account the weight of each probe. The intensity of the diffuse global illumination at the selected point is calculated by evaluating the spherical harmonic basis function for the normal at the selected point and adding the results scaled by the corresponding blended SH coefficients to yield a sum; and (ii) normalizing the sum by dividing it by the sum of the weights of the probes used in the calculation (see step 570).

For example, in the case of order 3 spherical harmonics, with two probes pr2, pr3 and corresponding weights $W_{pr2}$, $W_{pr3}$, the intensity of the diffuse global illumination at the selected point having a normal ($\theta$, $\varphi$) is equal to:

$$(SH_{00}'*Y_{00}(\theta,\varphi))+(SH_{11}'*Y_{11}(\theta,\varphi))+ \ldots +(SH_{22}'*Y_{22}(\theta,\varphi))/(W_{pr2}+W_{pr3})$$

where $$SH_{lm}'=W_{pr2}*SH_{lm}(pr2)+W_{pr3}*SH_{lm}(pr3).$$

As such, despite the fact that each probe in the set of potentially influential probes is associated with a weight, not all potentially influential probes actually turn out to be influential (as per the visibility test at step 560). For example, the zone in which the selected point is located may not be visible from all probes in the set. This effectively discounts the influence of certain potentially influential probes, which means that the overall sum of the weights of the probes from which the zone containing the selected point is visible is less than the sum of the weights of all probes in the set of potentially influential probes for the selected point. Normalization at step 590 thus ensures that the diffuse global illumination is not artificially greater, merely by virtue of the fact that the zone containing the selected point may be visible from a greater number of probes.

Finally, the intensity of the diffuse global illumination at the selected point is stored and used elsewhere in the rendering process. The processor 10 then selects a next point and returns to step 520.

Those skilled in the art will appreciate that SH coefficients are a specific non-limiting example of irradiance parameters and that computing a linear combination of the SH parameters and spherical harmonic basis functions evaluated at a normal associated with the selected point is a non-limiting example of a mapping function of irradiance parameters that can be used to determine the diffuse global illumination component.

Those skilled in the art will appreciate that embodiments of the present invention may be useful in a variety of applications, such as computer games, civilian and military simulation environments, virtual reality, computer-aided animation and cinematography, and the like.

Those skilled in the art will also appreciate that computation of the diffuse global illumination in accordance with certain embodiments may allow the more efficient use of computational resources due to the use of probes, and further due to the use of zones created by occlusion planes or axes, while still obtaining realistic lighting that emulates the effects of occluding objects in the scene geometry.

Certain additional elements that may be needed for operation of some embodiments have not been described or illustrated, as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

What is claimed is:

1. A computer-implemented method for determining an illumination component for a selected point in a multi-dimensional space, comprising:
    identifying a set of probes associated with the selected point, the probes located in the multi-dimensional space;
    for each selected one of the probes, determining which of a plurality of zones for the selected probe contains the selected point and determining visibility of said determined zone from the selected probe, wherein the zones for each selected probe are defined by intersections of pre-defined occlusion planes for the selected probe; and
    deriving an illumination component at the selected point by combining scene irradiance data associated with those of the probes from which the corresponding determined zone is determined to be visible.

2. The computer-implemented method defined in claim 1, wherein said identifying a set of probes associated with the selected point comprises determining a region in which the selected point is located and identifying a set of probes associated with the region.

3. The computer-implemented method defined in claim 2, wherein said steps of determining which of a plurality of zones and determining visibility are carried out for each probe in the set.

4. The computer-implemented method defined in claim 2, wherein identifying a set of probes associated with the region comprises consulting a memory to retrieve a set of probes that are predetermined to have potential influence over illumination of the selected point.

5. The computer-implemented method defined in claim 1, wherein the number of occlusion planes for the selected probe is three.

6. The computer-implemented method defined in claim 1, wherein said determining visibility of said determined zone from the selected probe comprises applying a visibility mask associated with the selected probe.

7. The computer-implemented method defined in claim 6, wherein the visibility mask associated with the selected probe encodes the zone or zones that are visible from the selected probe, or the fact that there is no zone visible from the selected probe.

8. The computer-implemented method defined in claim 7, wherein the determined zone is encoded by a code and wherein said applying a visibility mask associated with the selected probe comprises effecting a comparison between said code and said visibility mask associated with the selected probe.

9. The computer-implemented method defined in claim 8, further comprising consulting a memory to access the visibility mask associated with the selected code.

10. The computer-implemented method defined in claim 1, wherein said combining scene irradiance data associated with those of the probes from which the corresponding determined zone is determined to be visible, hereinafter a sighted probe, comprises (i) determining irradiance data for each sighted probe; (ii) determining a weight of each sighted probe; (iii) computing a weighted sum of the irradiance data for each sighted probe.

11. The computer-implemented method defined in claim 10, wherein identifying a set of probes associated with the selected point comprises determining a region in which the selected point is located and identifying a set of probes associated with the region and wherein, for the selected point, the number of probes in the set is greater than the number of sighted probes.

12. The computer-implemented method defined in claim 1, wherein the irradiance data is diffuse global illumination data.

13. The computer-implemented method defined in claim 1, wherein said combining scene irradiance data associated with those of the probes from which the corresponding determined zone is determined to be visible, hereinafter a sighted probe, comprises (i) determining an array of irradiance parameters for each sighted probe; (ii) determining a weight of each sighted probe; (iii) for each element of the array, computing a weighted sum of the corresponding irradiance parameter across the sighted probes to result in a corresponding blended irradiance parameter; (iv) computing a mapping function of the blended irradiance parameters, thereby to determine the illumination component.

14. The computer-implemented method defined in claim 13, wherein the weight of each sighted probe is based at least in part on a distance between the selected point and the probe.

15. The computer-implemented method defined in claim 13, wherein the weight of at least two sighted probes is proportional to a distance between the selected point and that probe and the weight of at least a third one of the sighted probes is not proportional to a distance between the selected point and the third sighted probe.

16. The computer-implemented method defined in claim 13, wherein the weighted sum is normalized by the sum of the weights of the sighted probes.

17. The computer-implemented method defined in claim 13, wherein the irradiance parameters are spherical harmonic coefficients and wherein the mapping function comprises a linear combination of the spherical harmonic parameters and spherical harmonic basis functions evaluated at a normal associated with the selected point.

18. The computer-implemented method defined in claim 17,-wherein the normal is the normal of the selected point.

19. The computer-implemented method defined in claim 17,-wherein the spherical harmonic basis functions are of order 3.

20. The computer-implemented method defined in claim 1, wherein said combining scene irradiance data associated with those probes from which the corresponding determined zone is determined to be visible, hereinafter a sighted probe, comprises (i) determining an array of irradiance parameters for each of at least two sighted probes; (ii) determining an illumination component for each of the sighted probes by computing a mapping function of the blended irradiance parameters for that sighted probe; (iii) determining a weight of each of the sighted probes; (iv) computing a weighted sum of the illumination components for the sighted probes, thereby to determine the illumination component.

21. The computer-implemented method defined in claim 20, wherein the weight of each sighted probe is based at least in part on a distance between the selected point and the probe.

22. The computer-implemented method defined in claim 20, wherein the weight of at least one sighted probe is not proportional to a distance between the selected point and that probe.

23. The computer-implemented method defined in claim 20, wherein the weighted sum is normalized by the sum of the weights of the sighted probes.

24. The computer-implemented method defined in claim 20, wherein the irradiance parameters are spherical harmonic coefficients and wherein the mapping function comprises a linear combination of the spherical harmonic parameters and spherical harmonic basis functions evaluated at a normal associated with the selected point.

25. The computer-implemented method defined in claim 24, wherein the normal is the normal of the selected point.

26. The computer-implemented method defined in claim 1, wherein the space is a two-dimensional space.

27. The computer-implemented method defined in claim 1, wherein the space is a three-dimensional space.

28. The computer-implemented method defined in claim 1, the illumination component being a first illumination component that is part of a global illumination component, the method further comprising:
deriving a local illumination component; and
rendering the selected point on a display device based on a combination of the local and global illumination components.

29. The computer-implemented method defined in claim 28, wherein the rendering is carried out in real-time and is dependent on user input.

30. The computer-implemented method defined in 28, wherein the local illumination component is derived in real-time.

31. The computer-implemented method defined in 30, wherein the first illumination component is derived in real-time.

32. The computer-implemented method defined in 31, wherein the plurality of zones for each selected one of the probes are determined in non-real-time.

33. The computer-implemented method defined in 32, wherein said determining visibility is based on a visibility mask that is pre-computed for each probe.

34. A system for determining an illumination component for a selected point in a multi-dimensional space, comprising:
a processor;
a memory storing information identifying a plurality of probes in the multi-dimensional space and information associated therewith;
the processor configured for:
identifying a set of probes associated with the selected point, the probes located in the multi-dimensional space;
for each selected one of the probes, determining which of a plurality of zones for the selected probe contains the selected point and determining visibility of said determined zone from the selected probe, wherein the zones for each selected probe are defined by intersections of pre-defined occlusion planes for the selected probe; and
deriving an illumination component at the selected point by combining scene irradiance data associated with those probes from which the corresponding determined zone is determined to be visible.

35. A computer-readable medium comprising computer readable instructions which, when executed by a computing device, cause the computing device to execute a method for determining an illumination component for a selected point in a multi-dimensional space, the method comprising:
identifying a set of probes associated with the selected point, the probes located in the multi-dimensional space;
for each selected one of the probes, determining which of a plurality of zones for the selected probe contains the selected point and determining visibility of said determined zone from the selected probe, wherein the zones for each selected probe are defined by intersections of pre-defined occlusion planes for the selected probe; and
deriving an illumination component at the selected point by combining scene irradiance data associated with those probes from which the corresponding determined zone is determined to be visible.

36. A game apparatus, comprising
an input/output interface allowing a user to control game inputs and perceive game outputs;
a memory storing (i) information associating a plurality of zones in a multi-dimensional space with corresponding sets of probes in the multi-dimensional space; (ii) executable instructions;
a processor configured for executing the executable instructions to derive an illumination component at each of a plurality of selected points in the multi-dimensional space from scene irradiance data associated with each of one or more probes from which a zone containing the selected point is visible, the one or more probes being selected from the set of probes corresponding to the zone;
wherein the zones for each probe are defined by intersections of pre-defined occlusion planes for the probe.

37. A computer-implemented method for determining an illumination component for a selected point in a multi-dimensional space, comprising:
identifying a set of probes associated with the selected point, the probes located in the multi-dimensional space;
for each selected one of the probes, determining which of a plurality of zones for the selected probe contains the selected point and determining visibility of said determined zone from the selected probe; and
deriving an illumination component at the selected point by combining scene irradiance data associated with those of the probes from which the corresponding determined zone is determined to be visible;
wherein said identifying a set of probes associated with the selected point comprises determining a region in which the selected point is located and identifying a set of probes associated with the region; and wherein said determining a region in which the selected point is located comprises accessing a grid of regions.

38. A computer-implemented method for determining an illumination component for a selected point in a multi-dimensional space, comprising:
  identifying a set of probes associated with the selected point, the probes located in the multi-dimensional space;
  for each selected one of the probes, determining which of a plurality of zones for the selected probe contains the selected point and determining visibility of said determined zone from the selected probe; and
  deriving an illumination component at the selected point by combining scene irradiance data associated with those of the probes from which the corresponding determined zone is determined to be visible;
  wherein said determining which of a plurality of zones for the selected one of the probes contains the selected point comprises carrying out an operation involving the selected point and each of a plurality of pre-defined occlusion planes for the selected one of the probes to obtain a final result indicative of the determined zone.

39. The computer-implemented method defined in claim 38, further comprising accessing a memory to retrieve identification parameters of the occlusion planes for the selected probe.

40. The computer-implemented method defined in claim 39, further comprising creating the zones from the occlusion planes and storing identification parameters of the zones in the memory, in association with the selected probe.

41. The computer-implemented method defined in claim 40, wherein creating zones from the occlusion planes comprises defining a zone as being in front of or behind each of the occlusion planes.

42. A computer-implemented method for determining an illumination component for a selected point in a multi-dimensional space, comprising:
  identifying a set of probes associated with the selected point, the probes located in the multi-dimensional space;
  for each selected one of the probes, determining which of a plurality of zones for the selected probe contains the selected point and determining visibility of said determined zone from the selected probe; and
  deriving an illumination component at the selected point by combining scene irradiance data associated with those of the probes from which the corresponding determined zone is determined to be visible;
  wherein said determining visibility of said determined zone from the selected probe comprises applying a visibility mask associated with the selected probe;
  wherein the visibility mask associated with the selected probe encodes the zone or zones that are visible from the selected probe, or the fact that there is no zone visible from the selected probe;
  wherein the zones for the selected probe are defined by intersections of pre-defined occlusion planes for the selected probe and wherein the visibility mask associated with the selected probe encodes at least two zones that are adjacent in the multi-dimensional space.

43. A computer-implemented method for determining an illumination component for a selected point in a multi-dimensional space, comprising:
  identifying a set of probes associated with the selected point, the probes located in the multi-dimensional space;
  for each selected one of the probes, determining which of a plurality of zones for the selected probe contains the selected point and determining visibility of said determined zone from the selected probe; and
  deriving an illumination component at the selected point by combining scene irradiance data associated with those of the probes from which the corresponding determined zone is determined to be visible;
  wherein said determining visibility of said determined zone from the selected probe comprises applying a visibility mask associated with the selected probe;
  wherein the visibility mask associated with the selected probe encodes the zone or zones that are visible from the selected probe, or the fact that there is no zone visible from the selected probe;
  wherein the zones for the selected probe are defined by intersections of the occlusion planes for the selected probe and wherein the visibility mask associated with the selected probe encodes only zones that are non-adjacent in the multi-dimensional space.

44. A computer-implemented method for determining an illumination component for a selected point in a multi-dimensional space, comprising:
  identifying a set of probes associated with the selected point, the probes located in the multi-dimensional space;
  for each selected one of the probes, determining which of a plurality of zones for the selected probe contains the selected point and determining visibility of said determined zone from the selected probe; and
  deriving an illumination component at the selected point by combining scene irradiance data associated with those of the probes from which the corresponding determined zone is determined to be visible;
  wherein said determining visibility of said determined zone from the selected probe comprises applying a visibility mask associated with the selected probe;
  wherein the visibility mask associated with the selected probe encodes the zone or zones that are visible from the selected probe, or the fact that there is no zone visible from the selected probe;
  wherein the determined zone is encoded by a code and wherein said applying a visibility mask associated with the selected probe comprises effecting a comparison between said code and said visibility mask associated with the selected probe;
  wherein said comparison comprises a bit-wise AND.

* * * * *